United States Patent
Chen et al.

(10) Patent No.: US 11,112,725 B2
(45) Date of Patent: Sep. 7, 2021

(54) CONSUMABLE CHIP, CONSUMABLE AND CONSUMABLE COMMUNICATION METHOD

(71) Applicant: Hangzhou Chipjet Technology Co., Ltd., Hangzhou (CN)

(72) Inventors: Zhiye Chen, Hangzhou (CN); Zhengdong Zhang, Hangzhou (CN)

(73) Assignee: HANGZHOU CHIPJET TECHNOLOGY CO., LTD, Hangzhou (CN)

( * ) Notice: Subject to any disclaimer, the term of this patent is extended or adjusted under 35 U.S.C. 154(b) by 0 days.

(21) Appl. No.: 16/620,433

(22) PCT Filed: Aug. 10, 2018

(86) PCT No.: PCT/CN2018/099781
§ 371 (c)(1),
(2) Date: Dec. 6, 2019

(87) PCT Pub. No.: WO2019/196285
PCT Pub. Date: Oct. 17, 2019

(65) Prior Publication Data
US 2020/0142330 A1    May 7, 2020

(30) Foreign Application Priority Data
Apr. 11, 2018   (CN) .......................... 201810318487.6

(51) Int. Cl.
*G03G 15/08* (2006.01)
*G03G 15/00* (2006.01)
*G06F 3/12* (2006.01)

(52) U.S. Cl.
CPC ..... *G03G 15/0863* (2013.01); *G03G 15/5079* (2013.01); *G06F 3/1219* (2013.01);
(Continued)

(58) Field of Classification Search
CPC .......... G03G 15/0863; G03G 21/1875; G03G 21/1878; G03G 21/1882;
(Continued)

(56) References Cited

U.S. PATENT DOCUMENTS

2011/0075189 A1* 3/2011 Refstrup ............... G06F 21/608
358/1.14
2012/0023027 A1   1/2012 Sundquist et al.

FOREIGN PATENT DOCUMENTS

| CN | 102112977 A | 6/2011 |
| CN | 105683843 A | 6/2016 |
| CN | 106956516 A | 7/2017 |

OTHER PUBLICATIONS

International Search Report of PCT Patent Application No. PCT/CN2018/099781 dated Dec. 27, 2018.

* cited by examiner

Primary Examiner — Thomas S Giampaolo, II
(74) Attorney, Agent, or Firm — NZ Carr Law Office

(57) ABSTRACT

The present invention relates to the technical field of printer consumables, and particularly relates to a consumable chip, a consumable and a consumable communication method. A session key for communication authentication is determined based on a communication session chip count which is selected by the consumable chip and stored in a storage device. The calculation process of the communication session chip count is avoided, thereby increasing the response speed of the consumable chip for a read request of an imaging device, and reducing the error rate.

13 Claims, 2 Drawing Sheets

(52) U.S. Cl.
CPC .......... *G06F 3/1222* (2013.01); *G06F 3/1238* (2013.01); *G06F 3/1285* (2013.01)

(58) Field of Classification Search
CPC ... G03G 2215/0695; G03G 2215/0697; G03G 2221/1823; G06F 3/1219; G06F 3/1222; G06F 3/1238
See application file for complete search history.

CONSUMABLE CHIP, CONSUMABLE AND CONSUMABLE COMMUNICATION METHOD

TECHNICAL FIELD

The present invention relates to the technical field of printer consumables, and particularly relates to a consumable chip, a consumable and a consumable communication method.

BACKGROUND ART

When a consumable is mounted on an imaging device, the consumable can only be allowed to be used when it passes the on-line authentication of the imaging device and authentication during the imaging operation. The communication authentication between the imaging device and the consumable is usually performed based on an imaging device session key of an imaging device terminal, matched with a consumable session key of the consumable. In order to pass the authentication of the imaging device, the consumable needs to perform feedback response to the imaging device according to the authentication mechanism of the imaging device. If the consumable does not feed the expected result back to the imaging device within the expected time of the imaging device, the consumable can not be used on the imaging device. Imaging devices of different brands or imaging devices of different types but the same brand may have different authentication mechanisms, such as different expected feedback times or different expected feedback results.

SUMMARY OF THE INVENTION

The present invention is directed to a consumable chip with high stability and low error rate. The consumable chip includes:

a communication circuit for receiving a communication session chip count request of an imaging device;

a storage circuit for storing consumable information and a plurality of communication session chip counts; and a logic circuit for generating a consumable session key based on the communication session chip count.

The consumable chip selects one of the communication session chip counts and supplies the communication session chip count to the imaging device in response to the communication session chip count request, and generates and stores the consumable session key based on the selected communication session chip count by means of the logic circuit.

In the above technical solution, the session key for communication authentication is determined based on the communication session chip count selected by the consumable chip rather than a communication session chip count generated by calculation. The calculation process of the communication session chip count is avoided, thereby improving the response speed of the consumable chip for a read request of an imaging device, and reducing the error rate.

Preferably, the consumable chip selects a used communication session chip count or an unused communication session chip count and supplies the used or unused communication session chip count to the imaging device in response to the communication session chip count request, and generates and stores a consumable session key based on the selected communication session chip count by means of the logic circuit. The consumable chip selects the unused communication session chip count to ensure that the communication session chip counts used by the consumable in response to each communication session chip count request of the imaging device are different so as to further improve the security.

Preferably, the consumable chip specifies or sequentially selects the consumable communication session chip counts in the storage circuit to respond to the communication session chip count request. The storage structure and selection flow of communication session chip counts are simplified, the program for implementing the operation in the consumable chip is simpler and easier to implement, and the response speed is higher.

Preferably, the communication session chip counts stored in the storage circuit can be reset and updated.

Preferably, the storage circuit includes a volatile storage unit and a non-volatile storage unit. The communication session chip counts are stored in the non-volatile storage unit, and the consumable session keys are stored in the volatile storage unit.

The present invention is also directed to a consumable, including:

a consumable chip for storing consumable information and a plurality of communication session chip counts; and a communication link for communicating the consumable chip with an imaging device when the consumable is mounted on the imaging device.

The consumable chip receives a communication session chip count request of the imaging device by means of the communication link; and the consumable chip selects one of the communication session chip counts and supplies the communication session chip count to the imaging device in response to the communication session chip count request, and generates and stores a consumable session key based on the selected communication session chip count.

Similarly, the consumable in the above technical solution determines the session key for communication authentication based on the communication session chip count selected by the consumable chip rather than a communication session chip count generated by calculation. The calculation process of the communication session chip count is avoided, thereby improving the response speed of the consumable chip for the read request of the imaging device, and reducing the error rate.

Preferably, the consumable chip selects a used communication session chip count or an unused communication session chip count and supplies the used or unused communication session chip count to the imaging device in response to the communication session chip count request, and generates and stores a consumable session key based on the selected communication session chip count.

Preferably, the consumable chip specifies or sequentially selects consumable communication session chip counts it stored to respond to the communication session chip count request.

Preferably, the communication session chip counts stored in the consumable chip can be reset and updated.

Preferably, the consumable chip includes a volatile storage unit and a non-volatile storage unit. The communication session chip counts are stored in the non-volatile storage unit, and the consumable session keys are stored in the volatile storage unit.

The present invention is also directed to a consumable communication method, including:

Sc-1, receiving a communication session chip count request from an imaging device; and Sc-2, selecting one of the communication session chip counts and supplying the communication session chip count to the imaging device in response to the communication session chip count request, and generating and storing a consumable session key based on the selected communication session chip count.

In the above technical solution, the consumable determines the session key for communication authentication based on the communication session chip count selected by the consumable chip rather than a communication session chip count generated by calculation. The calculation process of the communication session chip count is avoided, thereby improving the response speed of the consumable chip for the read request of the imaging device, and reducing the error rate.

Further, in step Sc-2, selecting an unused communication session chip count and supplying it to the imaging device in response to the communication session chip count request, and generating and storing a consumable session key based on the selected communication session chip count.

Further, in step Sc-2, the consumable chip sequentially selects stored communication session chip counts to respond to the communication session chip count request.

DETAILED DESCRIPTION OF THE INVENTION

Figure 1:
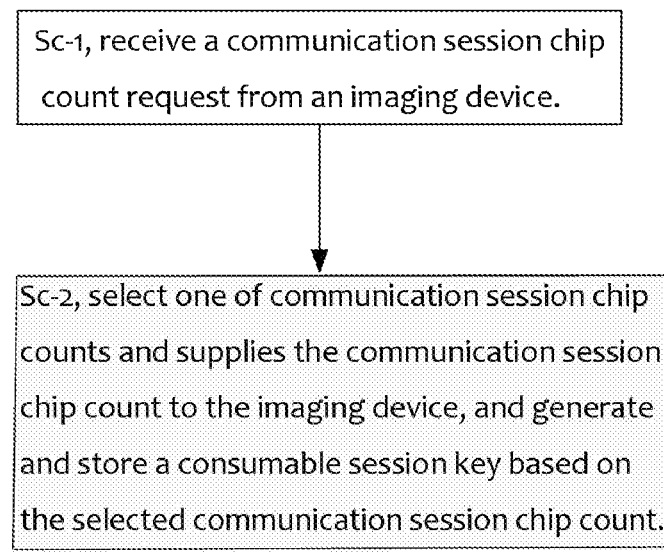
FIG. 1 is a flow diagram of a communication method for establishing a session key by an imaging system of the present invention.

The embodiments of the present invention are described in detail below with reference to the accompanying drawings.

The specific embodiment is only used for explaining the present invention but is not intended to limit the present invention. Technicians in this field can make modifications to this embodiment without creative contributions according to needs after finishing reading this specification, but all the modifications are protected by the patent law if the modifications fall within the scope of the claims of the present invention.

An existing imaging system includes an imaging device and a consumable capable of being mounted in the imaging device. The imaging device includes an imaging device storage circuit and an imaging device logic circuit. The storage circuit of the imaging device includes a non-volatile storage unit and a volatile storage unit. The non-volatile storage unit stores communication session chip counts of the imaging device. The logic circuit of the imaging device generates an imaging device session key for authenticating the consumable based on the communication session chip count, and stores the generated imaging device session key in the volatile storage unit.

The consumable 300 can be mounted in the imaging device 200 to provide an imaging material for the imaging device and can be replaced after the imaging material is used up. For example, the consumable can be an ink jet cartridge or an ink jet cartridge with ink jet and printing head components, a toner cartridge, an ink supply cartridge, or the like. The consumable 300 includes a consumable chip 200 and a communication link 301, and the communication link 301 is used for communicating the consumable chip with the imaging device when the consumable is mounted in the imaging device, so that the consumable chip 200 of the consumable mounted in the imaging device can be communicated with the imaging device. Specifically, the consumable chip in this embodiment includes a communication circuit 101, a storage circuit 102 and a logic circuit 103. The storage circuit 102 includes a volatile storage unit 1031 and a non-volatile storage unit 1032. The non-volatile storage unit 1032 stores consumable information and communication session chip counts of the consumable, wherein the consumable information includes the model, type, ink volume, serial number and the like of the consumable. The logic circuit of the consumable generates a consumable session key for communication authentication between the consumable and the imaging device based on the communication session chip count.

The process for authenticating the consumable mounted in the imaging device includes:

1. Establishment of Session Key

After the consumable is mounted in the imaging device, the consumable chip is communicated with the imaging device by means of the communication link. The imaging device sends a communication session chip count request to the consumable chip after detecting the mounting of the consumable.

FIG. 1 is a flow diagram of a communication method for establishing a session key by an imaging system of the present invention. In step Sc-1, the consumable chip 100 receives the communication session chip count request from the imaging device 200 by means of the communication circuit 101.

In step Sc-2, the consumable selects one communication session chip count it stored and supplies the selected communication session chip count to the imaging device 200 in response to the communication session chip count request of the imaging device, generates a consumable session key for communication authentication between the imaging device and the consumable based on the selected communication session chip count, and stores the generated consumable session key in the volatile storage unit 1031. The consumable determines the session key for communication authentication based on the communication session chip count selected by the consumable chip 100 rather than a communication session chip count generated by calculation. The calculation process of the communication session chip count is avoided, thereby improving the response speed of the consumable chip for the read request of the imaging device, and reducing the error rate. In an embodiment, the consumable chip randomly selects the communication session chip count in the non-volatile storage unit 1032 and supplies the selected communication session chip count to the imaging device 200 in response to the communication session chip count request of the imaging device, wherein "randomly" means that an object can be randomly selected, that is, either a used communication session chip count or an unused communication session chip count can be selected; or that a sequence can be randomly selected; or that an object and a sequence can be randomly selected. In an embodiment, the consumable chip specifies selection of a certain communication session chip count in the non-volatile storage unit 1032 and supplies the selected communication session chip count to the imaging device 200 in response to the communication session chip count request of the imaging device. In an embodiment, the consumable chip selects an unused communication session chip count in the non-volatile storage unit 1032 and supplies the selected communication session chip count to the imaging device in response to the communication session chip count request of the imaging device. In another embodiment, the consumable chip sequentially selects a plurality of communication session chip counts stored in the non-volatile storage unit 1032 and supplies the selected communication session chip counts to the imaging device, so that the communication session chip counts used by the consumable in response to each communication session chip count request of the imaging device are different so as to improve the security. The number of the communication session chip counts can be as many as possible in a storage number scope, and optimally, the number of the communication session chip counts stored is greater than the communication times between the consumable and the imaging device (imaging materials in the consumable are limited, and the communication times between the consumable and the imaging device are also limited), thereby ensuring that the communication session chip counts used by the consumable in response to each communication session chip count request of the imaging device are different. If the number of the communication session chip counts which be stored in the non-volatile storage unit 1032 is less than the number of communication times between the consumable and the imaging device, the reset operation can be performed after the stored communication session chip counts are used up, and the communication session chip counts stored in the non-volatile storage unit 1032 will be updated to ensure that the communication session chip counts used by the consumable in response to each communication session chip count request of the imaging device are different.

Figure 4:
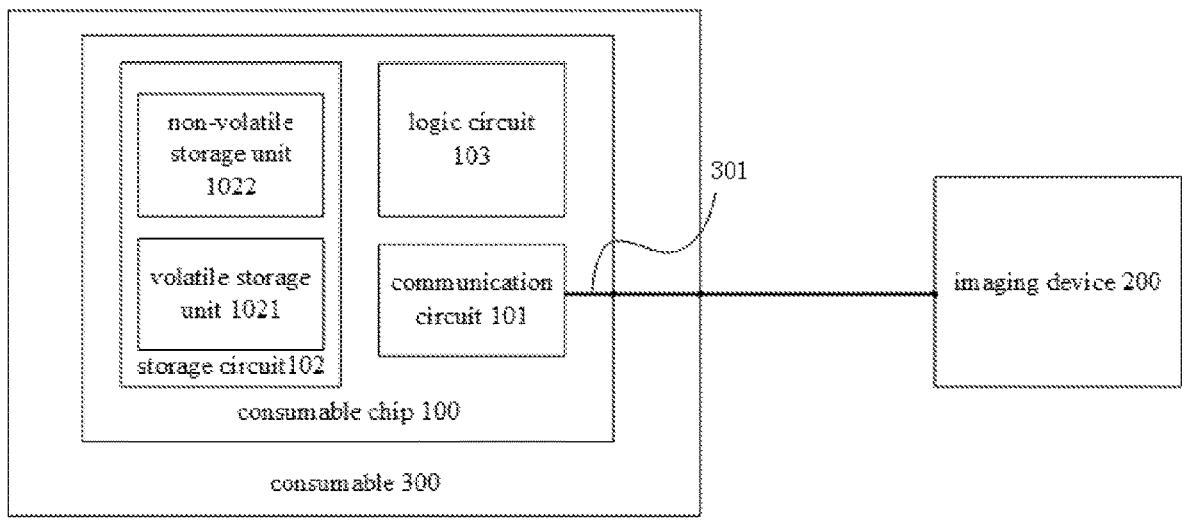
FIG. 4 is a schematic diagram of an imaging system according to the present invention.

FIG. 4 shows a schematic diagram of the imaging system.

After receiving the response of the consumable chip, the imaging device generates an imaging device session key based on the communication session chip count from the consumable chip, and stores the imaging device session key in the volatile storage unit. The consumable session key and imaging device session key generated based on the same communication session chip count are matched and are used for subsequent communication authentication between the imaging device and the consumable.

2. Communication Authentication Between Consumable and Imaging Device

After a session key is established between the consumable and the imaging device, the imaging device sends a read request to the consumable so as to acquire the consumable information stored in the consumable chip, and the imaging device sends a write request to the consumable so as to modify the consumable information stored in the consumable chip.

A. Read Request Response Process of Imaging Device

Figure 2:
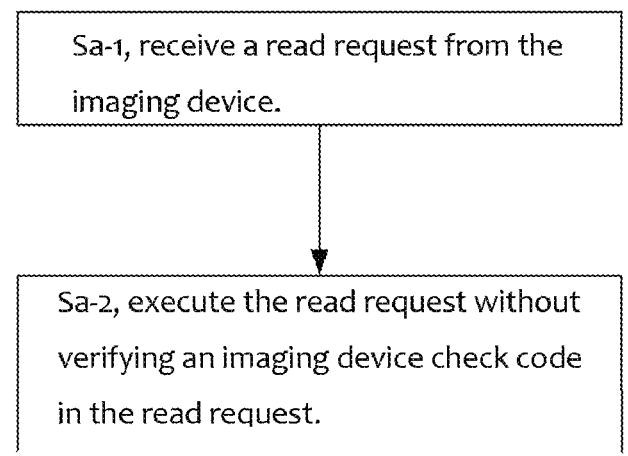
FIG. 2 is a flow diagram of the communication method of a consumable of the present invention with respect to a read request of an imaging device.

The imaging device calculates an imaging device check code for the read request by using an imaging device session key and an appropriate cryptographic algorithm. The imaging device check code in the read request is calculated with respect to the command and command parameters of the read request. For example, based on the command and command parameters of the read request, an appropriate encryption algorithm is adopted to calculate the imaging device check code. Imaging devices of different brands or imaging devices of different types but the same brand have different encryption methods for imaging device check codes. FIG. 2 is a flow diagram of a communication method of the consumable with respect to the read request of the imaging device. In step Sa-1, the consumable mounted in the imaging device receives the read request from the imaging device.

In step Sa-2, in order to enable the consumable chip to respond to the read request of the imaging device in time without being limited by an authentication mechanism of the imaging device, and to improve the response speed of the consumable chip for the read request of the imaging device, and to expand the compatibility of the consumable chip for imaging devices of different types, and to obtain a certain fault-tolerant capability, after the consumable 300 in this embodiment receives the read request of the imaging device 200, the consumable chip 100 directly executes the read request without verifying the imaging device check code in the read request of the imaging device. In an embodiment, the condition that the imaging device check code in the read request of the imaging device is not verified means that after the consumable chip receives the read request from the imaging device, only the command parameters in the read request are extracted, the imaging device check code of the read request is not acquired from the read request, and the consumable chip directly responds to the read request according to the command parameters of the read request. In another embodiment, the condition that the imaging device check code in the read request of the imaging device is not verified means that after the consumable chip receives the read request from the imaging device, the command parameters and the imaging device check code in the read request are extracted, but the imaging device check code is not stored, the logic circuit of the consumable chip also does not execute calculation of the consumable check code based on the read request and the consumable session key, and the consumable chip directly responds to the read request according to the command parameters of the read request. In another embodiment, the condition that the imaging device check code in the read request of the imaging device is not verified means that after the consumable chip receives the read request from the imaging device, the command parameters and the imaging device check code in the read request are extracted, and the imaging device check code is stored in the non-volatile storage unit. The logic circuit of the consumable chip calculates the consumable check code based on the read request and the consumable session key, does not store the consumable check code, and responds to the read request according to the command parameters of the read request.

The operation for executing the read request by the consumable chip includes the processes of querying the consumable information needing to be read by the imaging device in the storage circuit according to the parameters of the read request, and sending the consumable information to the imaging device to respond to the read request of the imaging device. The consumable chip executes the read request by providing the response including the consumable check code generated based on the consumable session key. The consumable check code in the read request response of the consumable is calculated with respect to the command and command parameters of the read request response. For example, based on the command and command parameters of the read request response, an appropriate encryption algorithm is adopted to calculate and produce the consumable check code. In this embodiment, the logic circuit of the consumable chip calculates a consumable check code, with respect to the command and command parameters of the read request response, based on the consumable session key, and sends the response including the consumable check code to the imaging device.

After the imaging device receives the read request response of the consumable, the imaging device extracts the command and command parameters of the read request response and extracts the consumable check code in the read request response, and stores the consumable check code. The logic circuit of the imaging device calculates and stores the imaging device check code based on the read request response and the imaging device session key. The logic circuit of the imaging device compares whether the consumable check code in the read request is matched with the calculated imaging device check code or not so as to authenticate the read request response of the consumable chip. If the consumable check code in the read request is matched with the calculated imaging device check code, the consumable passes the authentication of the imaging device, and the imaging device extracts the consumable information in the read request response to perform the next operation; and if the consumable check code in the read request is not matched with the calculated imaging device check code, the consumable does not pass the authentication of the imaging device, and the imaging device reports an error. The operation of reporting an error by the imaging device includes: the imaging device does not extract the consumable information in the read request response, the current operation of the imaging device is stopped, and the imaging device session key stored in a volatile storage unit of the imaging device is deleted. The response of the consumable chip to the read request of the imaging device includes the consumable check code for authentication of the imaging device, and the authentication process of an imaging device terminal is retained, so that the consumable chip of the present application can ensure the communication security of the imaging device while achieving the technical effects claimed in the present application.

B. Write Request of Imaging Device

Figure 3:
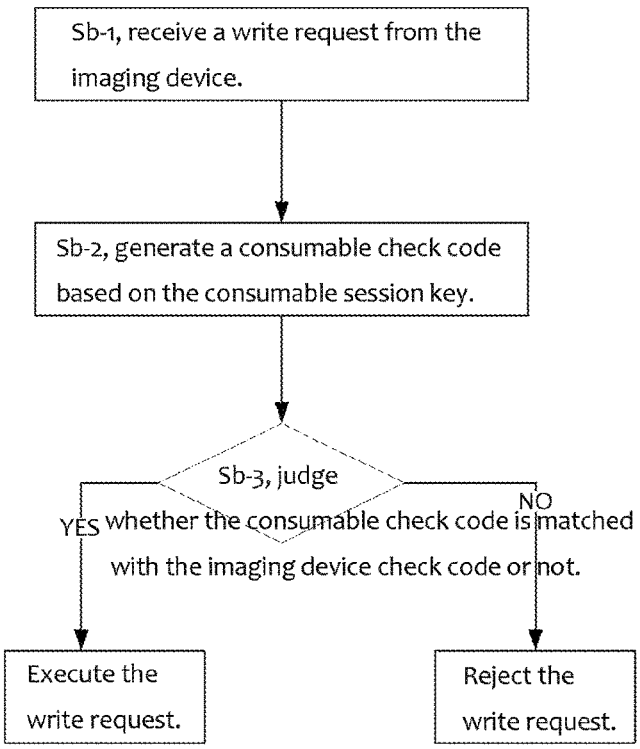
FIG. 3 is a flow diagram of the communication method of the consumable of the present invention with respect to a write request of the imaging device.

The imaging device calculates an imaging device check code for the write request by using an imaging device session key and an appropriate cryptographic algorithm. The imaging device check code in the write request is calculated with respect to the command and command parameters of the write request. For example, based on the command and command parameters of the write request, an appropriate encryption algorithm is adopted to calculate the imaging device check code. Imaging devices of different brands or imaging devices of different types but the same brand have different encryption methods for imaging device check codes. FIG. 3 is a flow diagram of a communication method of the consumable with respect to the write request of the imaging device. In step Sb-1, the consumable mounted in the imaging device receives the write request from the imaging device.

In order to ensure the write security of the consumable chip and prevent the consumable information stored in the consumable chip from being maliciously tampered by a third party, In step Sb-2, the consumable chip verifies the imaging device check code in the write request of the imaging device. In this embodiment, after the consumable receives the write request of the imaging device, the consumable chip extracts the command parameters and the imaging device check code in the write request, and stores the imaging device check code in the non-volatile storage unit. The logic circuit of the consumable chip calculates a consumable check code with respect to the write request based on the write request and the consumable session key, and stores the consumable check code.

In step Sb-3, the logic circuit of the consumable compares whether the imaging device check code in the write request is matched with the calculated consumable check code or not so as to authenticate the write request response of the imaging device. If the imaging device check code in the write request is matched with the calculated consumable check code, the imaging device passes the authentication of the consumable, and the consumable extracts the command parameters in the write request to execute the write request; and if the imaging device check code in the write request is not matched with the calculated consumable check code, the imaging device does not pass the authentication of the consumable, and the consumable rejects the write request. The operation of rejecting the write request includes: the write request is not executed, and the consumable session key stored in the volatile storage unit of the consumable is deleted.

Although the embodiments of the present invention are described with reference to the accompanying drawings, common technicians in this field can make various variations or modifications within the scope of the appended claims.

The invention claimed is:

1. A consumable chip, comprising:
a communication circuit for receiving a communication session chip count request of an imaging device,
a storage circuit for storing consumable information and a plurality of communication session chip counts, and
a logic circuit for generating a consumable session key based on one of the communication session chip counts,
wherein the consumable chip selects one of the plurality of communication session chip counts stored in the storage circuit and supplies the selected one of the plurality of communication session chip counts to the imaging device in response to the communication session chip count request, and generates and stores the consumable session key based on the selected one of the plurality of communication session chip counts by means of the logic circuit.

2. The consumable chip according to claim 1, wherein the consumable chip selects a used communication session chip count or an unused communication session chip count and supplies it to the imaging device in response to the communication session chip count request, and generates and stores the consumable session key based on the selected communication session chip count by means of the logic circuit.

3. The consumable chip according to claim 2, wherein the consumable chip specifies or sequentially selects the consumable communication session chip counts in the storage circuit to respond to the communication session chip count request.

4. The consumable chip according to claim 2, wherein the communication session chip counts stored in the storage circuit can be reset and updated.

5. The consumable chip according to claim 1, wherein the storage circuit comprises a volatile storage unit and a non-volatile storage unit; and
the communication session chip counts are stored in the non-volatile storage unit, and the consumable session keys are stored in the volatile storage unit.

6. A consumable, comprising:
a consumable chip for storing consumable information and a plurality of communication session chip counts, and
a communication link for communicating the consumable chip with an imaging device when the consumable is mounted on the imaging device,
wherein the consumable chip receives a communication session chip count request of the imaging device by means of the communication link; and
the consumable chip selects one of the plurality of communication session chip counts stored therein and supplies the selected on of the plurality of communication session chip counts to the imaging device in response to the communication session chip count request, and generates and stores a consumable session key based on the selected communication session chip count.

7. The consumable according to claim 6, wherein the consumable chip selects a used communication session chip count or an unused communication session chip count and supplies it to the imaging device in response to the communication session chip count request, and generates and stores a consumable session key based on the selected communication session chip count.

8. The consumable according to claim 7, wherein the consumable chip specifies or sequentially selects consumable communication session chip counts it stored to respond to the communication session chip count request.

9. The consumable according to claim 7, wherein the communication session chip counts stored in the consumable chip can be reset and updated.

10. The consumable according to claim 6, wherein the consumable chip comprises a volatile storage unit and a non-volatile storage unit; and the communication session chip counts are stored in the non-volatile storage unit, and the consumable session keys are stored in the volatile storage unit.

11. A consumable communication method, comprising:
Sc-1, receiving a communication session chip count request from an imaging device; and
Sc-2, selecting one of a plurality of communication session chip counts stored in the consumable chip and supplying the selected one of the plurality of communication session chip counts to the imaging device in response to the communication session chip count request, and generating and storing a consumable session key based on the selected one of the plurality of communication session chip counts.

12. The consumable communication method according to claim 11, further comprising, wherein in step Sc-2, selecting an unused communication session chip count and supplying it to the imaging device in response to the communication session chip count request, and generating and storing a consumable session key based on the selected communication session chip count.

13. The consumable communication method according to claim 12, wherein in step Sc-2, a consumable chip sequentially selects stored communication session chip counts to respond to the communication session chip count request.

* * * * *